Nov. 8, 1932.                L. C. HUCK                1,886,811
BRAKE
Filed June 30, 1930

Inventor
Louis C. Huck

By Blackmore, Spencer & Hiish
Attorneys

Patented Nov. 8, 1932

1,886,811

UNITED STATES PATENT OFFICE

LOUIS C. HUCK, OF NEW YORK, N. Y.

BRAKE

Application filed June 30, 1930. Serial No. 464,851.

This invention relates to brakes, more especially to internal shoe brakes as used quite generally on motor vehicles.

One object of the invention is to secure maximum braking efficiency with minimum pedal pressure.

Another object is to permit the use of linings having relatively high coefficients of friction.

Another object is to so design the brake as to leave as much of the drum surface as possible free from engagement by the shoes to permit the use of another similar or dissimilar brake within the same drum.

Another object is to secure an automatic change in the distribution of the pressures along the arc of the shoe between the shoe and the drum surface so as to avoid unduly high pedal pressure under certain conditions, and grabbing of the shoe under other conditions.

Many other advantages will be understood from the description.

Figure 1:
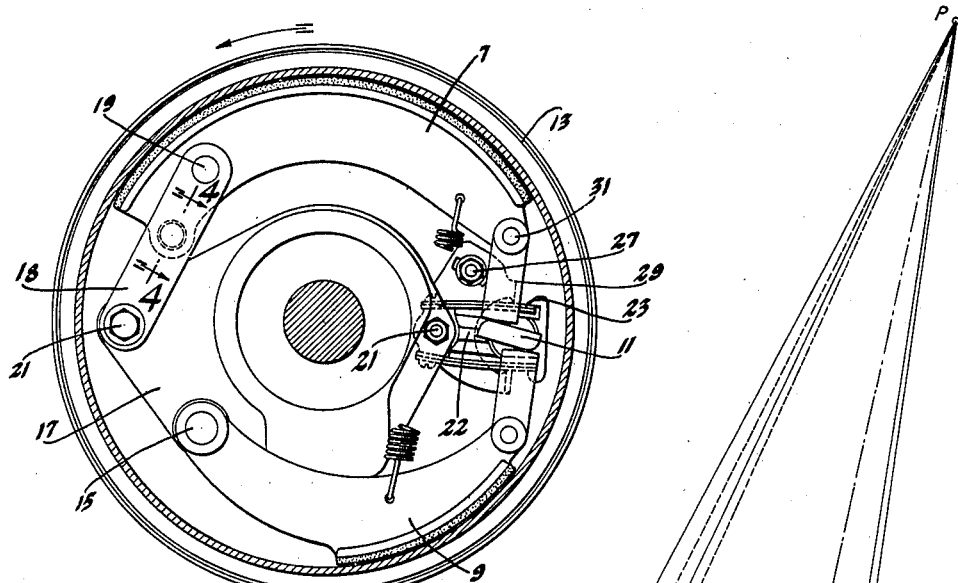
Fig. 1 is a view of the brake showing the parts in side elevation.
Figure 3:
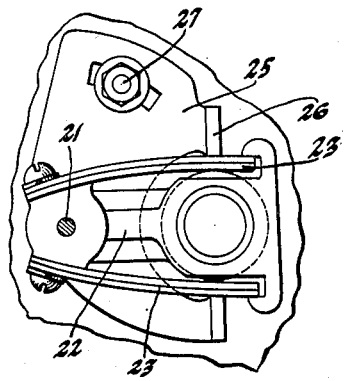
Fig. 3 is also a diagrammatic view of a detail.

The brake is shown as comprising two shoes, a long shoe 7 and a short shoe 9. These shoes are shown in a position to be expanded by a cam 11 located between their adjacent ends. The shoes frictionally engage the flange of a drum 13 which preferably, and in motor vehicle practice, will be carried by a vehicle wheel. The direction of drum rotation shown by the arrow represents the direction of rotation for forward vehicle travel. It will be seen that the long shoe 7 becomes self-actuating for the direction of rotation of the drum indicated. The short shoe is directly pivoted by a pivot pin 15 to the fixed plate 17. On the other hand a link 18 is pivoted at 19 to the long shoe and at 21 to the fixed plate 17. Preferably the cam is arranged to actuate the shoes by links or roller sectors 29 pivoted adjacent the ends of the shoes as at 31. If found necessary any convenient means such, for example, as a pin and slot between the extreme end of the shoes and the links 29 may be employed to limit the movement of the link about its pivot 31. Such a construction constitutes no part of the invention herein claimed and is shown, for example, in the patent to Chase 1,768,509, June 24, 1930.

It has heretofore been proposed to use a link articulating a brake shoe to a rigid plate, but it is the belief of applicant that he is the first to secure full advantage of such an articulating anchorage. To the best of his knowledge he is the first to associate with such an anchorage a floating cam or its equivalent whereby the applied pressure may be equalized between the two shoes. To that end his cam 11 is carried by a link 22 which swings about a pivot 21, the swinging of which is intended to permit the equal division of the applied pressure between the two shoes. The swinging is resisted by a spring or springs such at 23. This resisting spring serves to restore the cam to its neutral position subsequently to the brake application, adjustment of that neutral position being effected by any convenient means, as for example by a plate 25 having parts 26 engaging the springs 23 and held fast by an adjustable securing member 27. This centralizing means is intended to be illustrative only and is not per se a part of this invention. The invention involves the centralizing means broadly in combination with other elements.

By the use of the link 18 not only may the long shoe turn about its pivot 21, as it does in braking action, but it is free to turn about pivot 19. This latter pivotal connection is intended to function automatically at times to prevent the grabbing action of brake shoe 7 as for example when the coefficient of friction of the lining rises considerably above normal as from the influence of heat. It also functions to render the self-actuating force more efficient when the coefficient of friction becomes reduced below its normal.

It is well known that a floating cam operates to lessen required pedal pressure to produce a given intensity of brake action since the cam does not have to overcome the swinging movement of the non-self-actuating shoe under the influence of drum rotation as is the case with a journaled cam. When, however, this arrangement of the floating cam is associated with the articulated link arrangement as described above which is designed to automatically lessen pedal pressure when the coefficient of friction becomes low and prevent grabbing of the shoe when the coefficient becomes high, a new and very desirable arrangement exists.

As stated above applicant is not the first to use an articulating link for the anchorage of a brake shoe. He nevertheless believes that he is the first to so locate that link anchorage as to make possible the use of linings with relatively high coefficients of friction, and to thereby lessen pedal pressure to an extent not possible in constructions heretofore made. He also believes it to be novel with himself to so locate the anchorage that the point of maximum pressure along the arc of the shoe may automatically shift to prevent any danger of self-locking when the coefficient of friction increases and to prevent the brake becoming hard to operate if the coefficient of friction decreases below normal. It should be explained that a shoe becomes hard to operate when the region of high pressure is near the heel and a brake shoe tends to grab as the result of unduly high pressure near the toe, or cam follower.

The brake shoe has an arcuate surface with a radius substantially the same as that of the drum. The brake shoe, however, turns about a point E (see diagrammatic view) and the movement, radially, of the several points along the arc relative to the drum surface differs as the shoe swings. If a radius be drawn at right angles to the diameter through the shoe anchor E the point on the shoe in this radius (see radial line OA) has the maximum movement in the application and in the release of the shoe. Since there is a lesser movement in the case of points on the shoe arc in both directions from this 90° line, it will be seen that in releasing the shoe to provide clearance at the heel and toe there is a movement of the point in the 90° line more than necessary to effect its release. It will also be seen that by extending the shoe arc equally on each side of that 90° line the release movement of the shoe is minimized since under these circumstances the excess movement of the point in the 90° line is the same for both extreme positions. The desirability of minimizing release movement will be understood since all shoe movements are accomplished by pedal movements, and owing to the necessary leverage between the pedal and shoe all shoe movements are present to a multiplied extent at the pedal. To the same end— avoiding undue pedal movement—the shorter the shoe the better, and therefore any structural arrangements which add to the efficiency of the brake and therefore make possible a lesser length of arc are advantageous in practice. It is therefore very desirable that the middle point of the arc of the shoe should be in the 90° line, or, if that be impossible, it should be as near that line as may be.

It has been explained above that the middle point of the arc should be in the 90° line. This point will then have the greatest movement as the shoe moves into contact with the drum. When pressure is applied to produce frictional retardation since the greatest movement is in this 90° line here also the pressure will be greatest. In the preferred arrangement, therefore, this mid point lying in the 90° line may be called the high pressure point of the shoe when the shoe is pressed into contact with the drum.

At this point in the discussion the several forces acting on the self-actuating shoe may well be considered. There is the cam-applied force acting on a line between the contact point between the cam and the end of the shoe or rocker 29 which I prefer to use and the pivot point 31 between the rocker and the shoe. This force rotates the shoe about its pivot 21 (or pivot E as in the diagrammatic view). It rotates it counter-clockwise into contact with the drum. As the drum rotates, self-actuating frictional forces are set up as the result of drum rotation. The forces at the several points of tangency have varying lever arms, the longest being those of the forces adjacent the toe of the shoe. As a result, the tangential frictional force moments increase for such forces applied toward the toe of the shoe. Then there are the normal forces acting in a radial direction between the drum and the shoe.

It will be evident not only that the frictional forces adjacent the toe have relatively long lever arms, but that, within the range of the contact region, the effective components of the frictional forces operating to rotate the shoe and acting at right angles to lines from the shoe pivot to the points of tangency are relatively high. Also it will be seen that the proportion between the effective components and the frictional forces increases as the pivot point E approaches the center O. It is therefore to be desired that the point E be located as near the center O as possible in order to render the frictional forces as effective as possible in supplementing the cam-applied force. Obviously, there is a limit since these forces may become so great as to lock the shoe to the drum. It has been found most advantageous to assume a theoretical locking coefficient of friction at which a rigid, directly pivoted shoe will lock to the drum for a given length and location of shoe arc, which may be indicated by the angles $B_1$ and $B_2$ in the diagrammatic view and for such conditions to determine location of the point E in the case of a drum of given radius. This has been found to be possible by the use of the following formula:

$d$, anchor pin distance, =

$$r \times \text{locking coefficient} \times \frac{\left(\int_{B_1}^{B_2} \sin B \, dB\right)}{\left(\int_{B_1}^{B_2} \sin^2 B \, dB\right)}$$

In this formula $d$ is the distance between the anchor pivot E and the drum center and $r$ is the radius of the drum, the angles $B_1$ $B_2$ being as shown in the diagram.

It has also been found that the locus of the intersection of the resultants of the normal and frictional forces is an arc concentric with the drum and of greater radius than the drum, the position of the arc being dependent upon the radius of the drum and the angles $B_1$ and $B_2$ as before. The formula for locating this arc is as follows:

$$C_R = \frac{r \times \left(\int_{B_1}^{B_2} \sin B \, dB\right)}{\left(\int_{B_1}^{B_2} \sin^2 B \, dB\right)}$$

In this formula $C_R$ represents the radius of the arc, $r$ the radius of the circle and $B_1$ and $B_2$ the angles as in the diagram. Angles whose vertexes lie in this arc, one of the sides of which pass through the center O may be constructed such that the angles have tangents equal to assumed coefficients of friction. In the case of an assumed normal or control coefficient of friction the radial line OA, the 90° line described above, represents the line through which the resultant of the normal forces acts and the other side represents the line through which the resultant of the normal forces and the frictional forces act. If therefore a normal or control coefficient of friction be assumed such that the resultant of all the normal forces passes through the 90° line, the line AL whose tangent equals the assumed control coefficient of friction would be the line through which the resultant of both normal and frictional forces operate.

If then an actual locking coefficient be assumed for an articulated shoe, that is a coefficient such as will cause the shoe to lock to the drum in the absence of any cam-operated force, it is possible to construct an angle whose tangent is equal to the assumed actual locking coefficient, one side of the angle passing through the center of the circle and representing the resultant of all the normal forces then acting and the other line representing the resultant of both the normal and the frictional forces. It will be understood that this other line represents the condition where the normal and frictional forces are assumed to be great enough to lock the shoe to the drum in the absence of pedal pressure. The diagrammatic view shows by lines OAL and by lines OKE these two conditions. This figure also shows other angles having other tangents, the conditions prevailing with other coefficients of friction. For convenience this arc representing the locus of the resultants may be called the origin point circle. In the line KE at a point as far from E as is convenient is selected a point B for the pivot of the link 18 with the shoe 7.

Since this line KE represents the resultant of the normal and frictional forces which locks the shoe to the drum when no force is being applied by the cam, this line KE represents the ultimate resultant of all forces then operating, and therefore the point B being located in this resultant line there is no tendency of the shoe to turn about point B. The lines KE and AL extended intersect at a point P through which the force applied by the cam is to act. When no force is exerted by the cam as explained in the self-locking position of the parts the line PE represents the resultant of all the forces. In the case where the resultant of the frictional and normal forces operates through the line AL, or better through the line PL there must be a force applied by the cam in such a direction as to cooperate with the resultant of the frictional and normal forces and to produce an ultimate resultant which shall apply the shoe to the drum in such a way that the normal forces are equally distributed about the 90° line. In other words the resultant of the normal forces must be in the line OA, not OK, as in the case of the self-locking shoe. The combined resultant of the frictional and normal forces when acting through AL together with the cam forces produce a combined resultant corresponding with which there is a link axis such as to equally distribute the normal forces about the radial line OA.

If the parts be assumed to be in the self-locking position, and if the coefficient of friction becomes reduced from the self-locking coefficient to the control coefficient, the new forces will have a combined resultant which will have a lever arm (such a lever arm will be the perpendicular dropped center E to such resultant line) tending to cause the link to rotate. This resultant with its lever arm tends to rotate the link about the point E from the position it occupies when self-locking, swinging point B toward the center O. For every assumed coefficient of friction there is an angular position of the shoe and link such as to locate the high pressure point at a particular position in the arc of the shoe. Whenever the coefficient changes the effect of such action is to produce a change in the relative intensities of the normal forces at the several points along the arc of the shoe.

The unavoidable deflections of the drum and changes in the shape of the shoe, due among other causes to changes in temperature, permit a turning of the link and a relatively changed position of the shoe and link. Such a turning is accompanied by a redistribution of the pressure points along the shoe with a new position for the high pressure point. With an absolutely rigid drum and shoe not changeable in shape, there will be a tendency for the shoe to turn relative to the link but no actual change in relative position will take place. Such drums and shoes, however, do not exist, and in the absence of the pivot at B to offset unavoidable drum deflection and shoe distortion, when such deflection or distortion occurs, the action of the shoe might be such as to cause it to lock to the drum or to become unduly hard to operate.

It will therefore be seen that when the resultant of the normal and frictional forces operate along the line AL, which makes with the line AO an angle whose tangent is the assumed control coefficient, a condition will exist such that the forces are equally distributed about the 90° radial line. If the frictional coefficient changes a new distribution of the pressures between the drum and the shoe will take place as explained above, the high pressure point along the arc of the shoe moving either toward the heel or toward the toe away from the 90° line. It should be explained that preferably the line of action of the cam force should be determined to produce such a resultant with the line AL that the normal forces may be equally distributed about the 90° line as explained above. Nevertheless in some constructions it may be more convenient to establish a cam line and compromise on the control coefficient of friction. Variations also may be made in the assumed actual locking coefficient.

It is to be understood that in determining the point E a theoretical locking coefficient was assumed as for a rigid shoe pivoted at E. Such a shoe will lock with a coefficient of friction less than one which is anchored by the link, since the latter causes the readjustment of pressures as explained above. It will therefore be understood that in assuming an actual locking coefficient for an articulated shoe a coefficient higher than the assumed theoretical locking coefficient for the rigid shoe is made possible. The greater the difference between the assumed theoretical locking coefficient and the assumed actual locking coefficient, the greater will be the correction which may be had for changes in lining coefficients.

Referring now to the diagram to make clear the operation of the novel brake, it will be understood from what has been said, that a force applied at the cam operating through the point P cooperates with frictional and normal forces acting in the direction of the line AL to produce a combined resultant which will not only apply the shoe to the drum, but which will automatically so position the articulating link that the reacting forces between the shoe and the drum shall be equal on each side of the 90° line OA, with the high pressure point in that line. If now, with the brake so applied, there should be an increase in the coefficient of friction, due perhaps to a temperature change, that increase of coefficient will cause changes in the shoe and drum which might result in self-locking. Owing, however, to such changes and to drum deflection and shoe distortion rotation occurs not only about pivot E but about pivot B whereby the link line corresponds with the new resultant of forces. A new adjustment will take place which will cause the link to move about pivot E tending to swing the point B away from the center of the drum toward the drum flange, this swinging being accompanied by a rotation about point B as a result of which a line $OA_2$ will represent the resultant of the normal forces acting between the drum and the shoe.

This brings the high pressure point away from the 90° line to a point nearer the heel of the shoe. There is therefore an automatic correction. When the coefficient of friction rises and tends to render the friction effects greater, the point of high pressure simultaneously shifts to a region of the shoe nearer the heel so as to minimize the effects of the higher coefficient, and to that extent reduce the danger of self-locking.

In a similar way, should the frictional forces become less, the link tends to shift with an opposite direction of rotation and the high pressure point moves to a position A'. In this way when the intensity of the frictional forces decrease, the high pressure point has been moved up toward the toe of the shoe where the frictional force is more effective. Only when the frictional forces have become so high as the result of having reached the locking coefficient will the point K be reached in which the resultant locks the shoe to the drum. It is obvious that an actual coefficient may be assumed such as to prevent in practice any such locking of the shoe to the drum.

When the brake is released the long shoe should rotate about its anchor pin center E and not about the pivot B. To insure this action suitable frictional retarding means should be provided between the shoe and the link. To that end the shoe may be provided with an aperture 35 at its heel in which may be seated a spring 37 having at its ends abutments 39 engaging the two parts of the articulating link.

Figure 2:
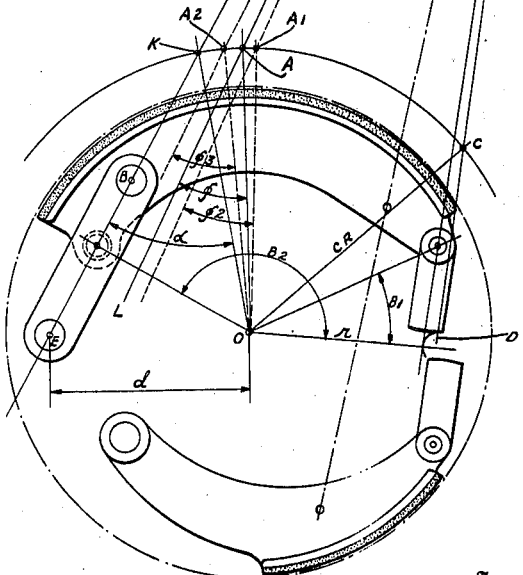
Fig. 2 is a diagrammatic view to illustrate the shifting high pressure positions.
Figure 4:
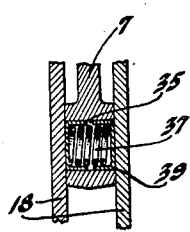
Fig. 4 is a section on line 4—4 of Fig. 1.

The pull of the retracting spring on the long shoe should be so arranged that it does not tend to pull the shoe toward the toe or toward the heel when the shoe is in the released position. This is accomplished by having the center line of the retractive spring pass through the intersection P of the cam force line and the link line as indicated by dot and dash line in Fig. 2. If for any reason the center line of the spring must pass outside the point P the discrepancy should be taken care of by increasing the frictional drag between the shoe and the links at the heel end of the shoe.

When the vehicle is moving backward and the brakes are applied, the long shoe becomes the non-self-actuating shoe, and the resultant of the normal and frictional forces crosses the arc of the lining surface on that side of the 90° line toward the toe end of the shoe. It is possible that this intersection may fall ahead of the toe of the shoe, a condition to be avoided as it will cause a shifting of the shoe when the brakes are applied during the backward motion of the car after having been applied during forward motion of the car. On the diagrammatic view a line PD has been drawn through the end of the lining. From C the intersection of PD with the origin point circle a line CO is drawn to the center of the brake. The angle OCD to avoid the shifting action mentioned above should be one whose tangent is at least as large as the highest coefficient of friction to be encountered. If this precaution is made there is no danger of the frictional and normal forces swinging the long shoe when it becomes non-self-actuating.

In the case of the short shoe the location of its pivot may be determined by the method indicated for locating the pivot E in the case of the long shoe. Obviously this point will be at a different distance from the center since the arc of the shoe is differently positioned and shorter than is the arc of the long shoe. Inasmuch as the short shoe functions chiefly in the case of reverse driving it has been found unnecessary to resort to the refinements of the articulated link used in the case of the long shoe.

Should it be found inconvenient to locate the long shoe symmetrically with reference to the 90° line a correction corresponding to the discrepancy should be made in locating the origin point circle.

By the above provisions it will be seen that maximum efficiency is obtained by the use of shoes arranged to best advantage within the brake drum and that the shoes occupy such a part of the drum as to leave room for an additional or an emergency brake within the same drum. Owing to the use of the articulating link it has been seen that it is possible to use linings of higher coefficients than heretofore without danger of self-locking, this result being accomplished by the shifting of the high pressure points of the shoe to and from the medial line. All the advantages of such an arrangement of shoes are supplemented by the use of the floating cam to divide the applied pressure equally between the self-actuating and the non-self-actuating shoe. In practice considerable latitude is possible in the assumption of such factors as the control coefficient, that being the coefficient of friction in the case where the resultant of the drum reaction forces lies in the 90° line; in the assumed theoretical locking coefficient which was used to determine the best location for point E; this being the locking coefficient for a rigid shoe pivoted at E, and in the assumed actual locking coefficient which was used to determine the position of the link relative to the shoe when the cam force is zero. It is also possible in practice to establish the cam force line and compromise in the control and actual locking coefficients.

I claim:

1. In a brake, a drum, shoes to engage the drum, a fixed support, a link pivoted to one of said shoes and to said support, the axis of said link being such that the high pressure point along the arc of the shoe lies in that drum radius which is at right angles to a diameter through the pivot between the link and the support for a predetermined assumed control coefficient of friction between the lining and the drum, floating brake applying means to spread adjacent ends of said shoes into contact with said drum.

2. In a brake, a drum, shoes to engage the drum, a fixed support, floating means between adjacent ends of said shoes to spread said shoes into drum engagement, means pivotally connecting one of said shoes to the fixed support, means affording a link articulation between the other shoe and the fixed support, said link articulation means having an axis such that the high pressure point along the arc of the shoe lies in that drum radius which is at right angles to a diameter through the pivot between the link and the support for a predetermined assumed control coefficient of friction between the lining and the drum.

3. In a brake, a drum, a pair of shoes, means to spread said shoes into frictional contact with said drum, a fixed support, means to directly pivot one of said shoes to the fixed support, a link pivoted to the other shoe and to the fixed support, the axis of said link being such that the high pressure point along the arc of the shoe lies in that drum radius which is at right angles to a diameter through the pivot between the link and the support for a predetermined assumed control coefficient of friction between the lining and the drum.

4. The invention defined by claim 3, the link articulated shoe having a longer arc of contact with the drum than the directly pivoted shoe.

5. In a brake, a drum, a fixed support, a shoe, means to cause the shoe to frictionally engage the drum, means to anchor said shoe for swinging relatively to said fixed support, said anchoring means being located at such a distance from the drum center as to render the shoe self-locking for an assumed theoretical coefficient of friction between the drum and the shoe.

6. In a brake, a drum, a shoe, a fixed support, means to move said shoe into frictional contact with said drum, a link pivoted to said shoe and to said support, the link being movable about its pivot with the support, its axis coinciding with the combined resultant of the frictional self-actuating force produced by the rotating drum upon the shoe and the normal forces between the drum and the shoe for an assumed actual locking coefficient of friction between the shoe and the drum.

7. In a brake, a rotatable drum, a fixed support, a shoe, means to move said shoe into frictional contact with said drum, a link pivoted to said shoe and to said support, said link coinciding with the resultant line of the several forces operating upon said shoe whereby the high pressure region of the arc of the shoe may move along the arc and is so positioned for an assumed normal or control coefficient of friction between the shoe and the drum that the high pressure point of the shoe lies substantially in the drum radius at right angles to a diameter through the pivot between the link and the fixed plate.

8. In a brake, a rotatably mounted drum, a fixed support, a shoe having a lining, means to move said shoe into contact with said drum, a link pivoted to said shoe and to said support, said link being movable about its pivot with the support, whereby said shoe is moved into contact with said drum, the axis of said link being such that the high pressure point along the arc of the shoe lies in that drum radius which is at right angles to a diameter through the pivot between the link and the support for a predetermined assumed control coefficient of friction between the lining and the drum.

9. In a brake, a drum, a fixed support, a shoe having a lining to engage the drum, a link pivoted to said shoe and to said support, mechanical means to rotate said shoe solely about the pivot between the link and the support and into contact with the drum, the axis of said link when the shoe is so engaged with the drum coinciding with the resultant of all the forces acting upon said shoe, and said axis being shiftable with changes in the coefficient of friction from an assumed normal or control coefficient in such a way that, for the control coefficient, the high pressure point of the shoe is in the radius at right angles to the diameter through the link pivot with the support and moves from that point when the coefficient changes.

10. In a brake, a rotatable drum, a fixed support, a shoe having a friction lining, a link pivoted to said shoe and to said fixed support, mechanical means to move said shoe into drum contact by turning said shoe and link as a unit about the pivot of the link with the support, the angular position of said shoe relative to the link being such that for an assumed control lining coefficient of friction the high pressure point of said lining lies in that drum radius at right angles to the diameter through the pivot between the link and the support.

11. In a brake, a rotatable drum, a fixed support, a shoe, a link pivoted to said shoe and to said support, means including an element for applying mechanical force to said shoe, said mechanical force being supplemented by a self-actuating frictional force, said forces acting to rotate said shoe into drum contact solely about the pivot between the link and the support for an assumed control coefficient of friction between the shoe and the drum, and also tending to rotate said shoe about the pivot point between the shoe and link as the frictional coefficient changes from the assumed control coefficient, whereby the high pressure point of the shoe is normally in the drum radius at right angles to a diameter through the pivot between the link and the support but which high pressure point moves therefrom to increase the effective action of the frictional self-actuating force when the coefficient decreases and to lessen the effective action of said frictional self-actuating force when the coefficient of friction rises above the assumed normal or control coefficient.

12. In a brake, a rotatable drum, a shoe, a fixed support, a first and second pivot anchorage between said shoe and said support, mechanical means to move said shoe into contact with the drum, the rotating drum serving as a self-actuating force to similarly rotate said shoe, said forces acting about the first of said pivots only for any one coefficient of friction but about the first and second pivots when the coefficient of friction is changing to thereby effect a change in the high pressure point of said shoe.

13. The invention defined by claim 12, the angular relation of said shoe to its anchorage for an assumed control coefficient being such that the high pressure point of the shoe lies in that drum radius which is at right angles to the diameter through the first pivot.

14. In a brake, a drum, a shoe, a fixed support, mechanical means to move said shoe into contact with said drum, a link pivoted to said support and to said shoe at a point between its mid point and its heel, means to rotate said shoe together with said link as a unit about the pivot between the link and the support, said shoe being rotatable about its pivotal connection with the link solely under the influence of changes in the coefficient of friction between the shoe and the drum and drum and shoe changes to thereby shift the high pressure point along the arc of the shoe.

15. The invention defined by claim 14, together with a shoe-releasing spring attached to said shoe and having its axis intersecting the point of intersection of the manually applied force and the longitudinal axis of the link.

In testimony whereof I affix my signature.

LOUIS C. HUCK.